Patented Apr. 12, 1932

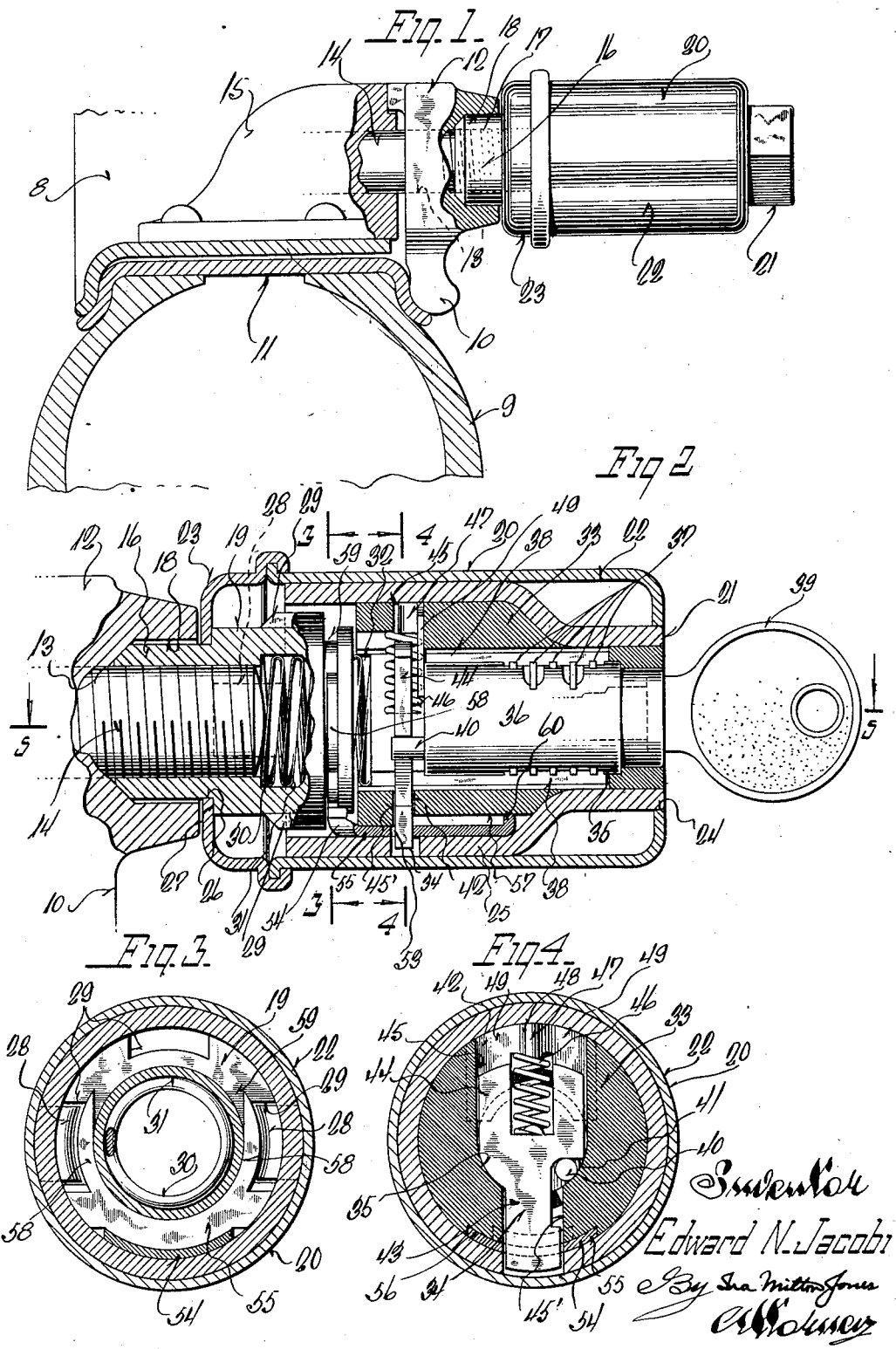

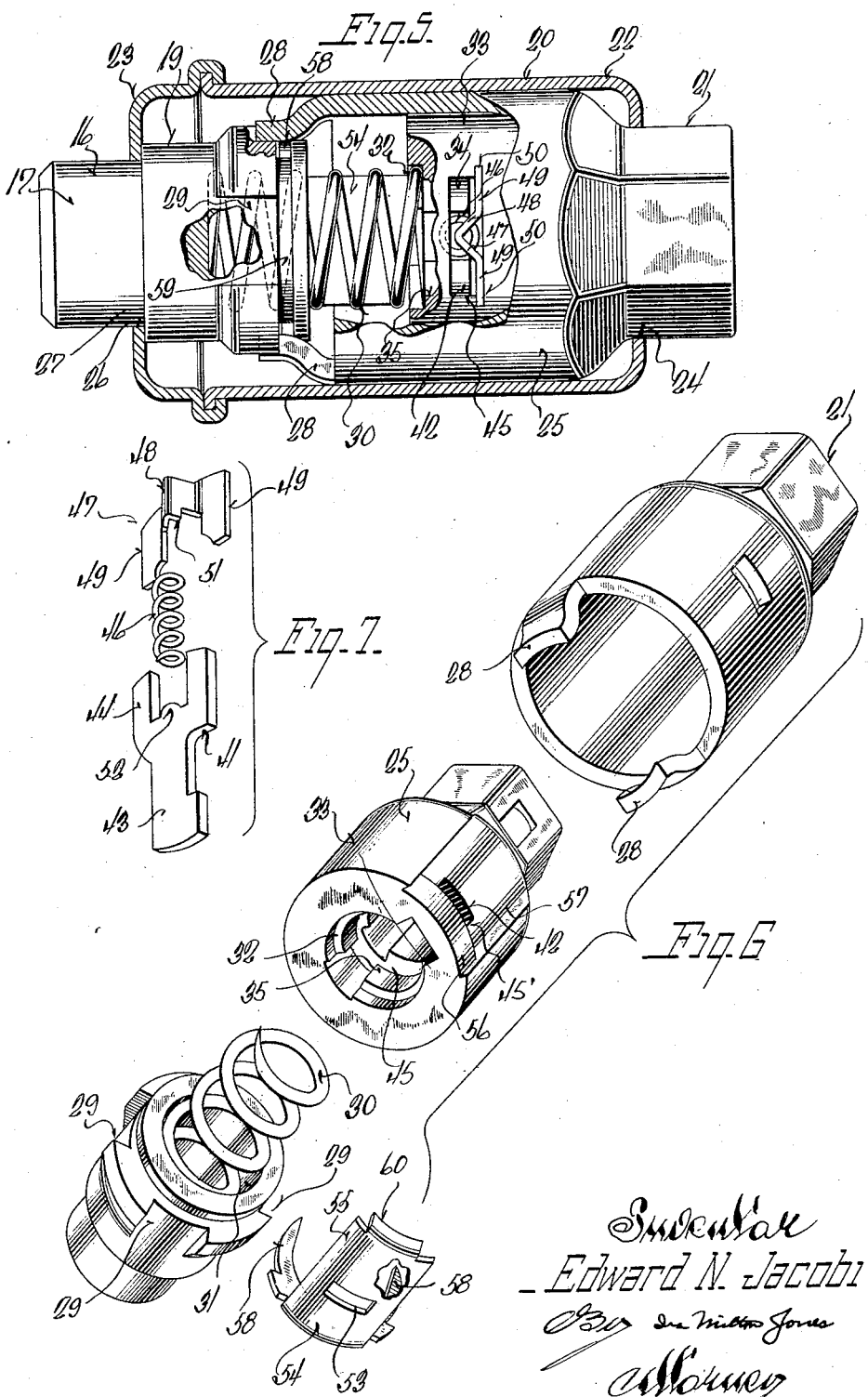

1,853,564

UNITED STATES PATENT OFFICE

EDWARD N. JACOBI, OF MILWAUKEE, WISCONSIN, ASSIGNOR TO BRIGGS & STRATTON CORPORATION, OF MILWAUKEE, WISCONSIN, A CORPORATION OF DELAWARE

LOCKING DEVICE

Application filed April 3, 1930. Serial No. 441,254.

This invention relates to certain new and useful improvements in locking devices and has as one of its objects, to provide key controlled means for locking a nut member against unauthorized movement.

Another object of this invention resides in the provision of a novel nut member particularly adapted for use with tire locking devices, and having a driving member adapted for engagement by a tool, the driving member being movable to and from a concealed position.

Another object of this invention resides in the provision of a nut member having a driving or actuating member normally drivingly connected therewith, and key controlled means for securing the driving member in a position disconnected from the nut member.

A further object of this invention is to provide a tire locking device of compact unitary construction, in which all of the elements are mounted within a single casing.

And a still further object of this invention resides in the provision of a tire locking device of the character described, having a disappearing portion of polygonal shape with which a tool is engageable when in unlocked position.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a cross sectional view of a portion of a conventional tire carrier and a tire mounted thereon, and illustrating the application of my improved locking device;

Figure 2 is an enlarged transverse sectional view taken through the locking device and illustrating in detail its application to a tire carrier stud;

Figure 3 is a cross sectional view taken through Figure 2 on the plane of the line 3—3;

Figure 4 is a cross sectional view taken through Figure 2 on the plane of the line 4—4;

Figure 5 is a view partly in section and partly in elevation taken on the plane of the line 5—5 of Figure 2 and illustrating the mechanism in unlocked position;

Figure 6 is a perspective view of the major elements of the structure shown separated and in their proper order of assembly, and Figure 7 is a perspective view illustrating in detail the construction of the locking bolt and its yieldable urging means.

Referring now more particularly to the accompanying drawings, in which like numerals designate like parts throughout the several views, the numeral 8 represents a portion of a conventional spare tire carrier upon which a tire 9 is adapted to be mounted in the usual manner to be secured thereon by the engagement of a clamping tongue 10 with the outer edge of the tire rim 11.

As is customary, the clamping tongue 10 has its enlarged upper end 12 apertured, as at 13, to be engaged over a stud 14 carried by an attaching member 15 secured to the carrier 8, and heretofore, the tongue has been held in clamping position merely by a nut threaded on the outer end of the stud. The present invention contemplates the combination with a novel nut element 16 for securing the tongue in clamping position of key controlled means for preventing unauthorized movement thereof.

The nut element is adapted for threaded engagement with the stud and has a cylindrical outer end portion 17 adapted to enter a counterbore 18 formed in the enlarged head of the clamping tongue to abut the bottom of the counterbore and force the tongue toward clamping position, as the nut element is threaded onto the stud. The inner end 19 of the nut element extends into an enclosure 20 from the opposite end of which a hexagonal driving member 21 is projectable to enable the entire assembly to be rotated by means of a conventional wrench or other suitable tool.

The driving member 21, however, is axially movable into the enclosure 20 when it is desired to lock the nut element against movement and is adapted to be held in said concealed or retracted position preventing the engagement therewith of a tool or wrench, by key controlled means to be later described. Means are also provided whereby the driving member 21 is drivingly connected with the nut element only when it is projected beyond the enclosure as illustrated in Figure 1, so that when in its retracted position, no means whatsoever are afforded for imparting rotation to the nut element; as the only portion of nut element not within the enclosure is its cylindrical end 17 which, when the nut element is in operative position, is inaccessible within the counterbore in the clamping tongue.

The enclosure 20 consists of a cup shaped casing or shell 22 and a cap or cover 23 secured thereto after the entire mechanism is properly assembled and inserted in the casing. The bottom of the casing, which forms the outer end of the enclosure has a hexagonal opening 24 through which the correspondingly shaped outer end of the driving member is projectable.

Inwardly of its hexagonal tool engageable end portion the driving member is expanded to form a cylindrical enlargement 25, whose outside diameter is substantially equal to the inside diameter of the casing 22 to be slidable therein to and from a position at which the driving member is drivingly engaged with the inner end 19 of the nut element.

As stated the inner end of the nut element is received within the enclosure 20, and its cylindrical outer end 17 projects through an opening 26 in the cap 23, with a shoulder 27 formed at the juncture of its inner and outer ends abutting the inner wall of the cap. A driving connection between the member 21 and the nut element is effected through the engagement of two diametrically opposite lugs 28 extended from the inner end of the driving member with two of a series of recesses 29 formed in the outer surface of the nut element inner end.

An expansive spring 30 having one end received in a counterbore 31 in the inner end of the nut element and its other end engaging in a counterbore 32 formed in the inner end of a lock cylinder mounting head 33 contained within the cylindrical portion of the driving member, normally yieldably urges the driving member to project its hexagonal tool engageable end outwardly of the enclosure and its lugs 28 into driving engagement with the recesses formed in the nut element; and to secure the driving member in retracted position the lock cylinder mounting head 33 is provided with a locking bolt 34.

It is noted that when the driving member is retracted, its lugs 28 are disposed inwardly of the nut element recesses 29, so that the driving member is rotatably free of the nut element, and as the outer enclosure, which turns with the driving member is at all times freely rotatable with respect to the nut element, rotation of the driving member and the enclosure, when the driving member is retracted, has no effect on the nut element.

The lock cylinder mounting member 33 substantially fills the interior of the driving member and has a longitudinal bore 35 in which a lock cylinder 36 is rotatably mounted. The lock cylinder is of conventional construction and has a plurality of locking tumblers 37 which normally yieldably extend into one of a pair of tumbler receiving grooves 38 formed in the mounting member in communication with its bore 35 and are adapted to be retracted within the periphery of the cylinder to free the same for rotation upon the insertion of a proper key 39.

As best illustrated in Figure 2, the inner end of the lock cylinder 36 terminates inwardly of the inner end of the mounting member and has an eccentrically located cam 40 projected rearwardly therefrom for operative engagement with a locking bolt abutment 41, whereby rotation of the cylinder imparts longitudinal movement to the locking bolt which is slidably mounted in a transverse slot 42 in the mounting head.

The locking bolt 34 is stamped from a flat piece of metal and as best shown in Figure 7 has a reduced end 43 and an enlarged head 44, and the slot 42 in which the bolt is slidably mounted has a wide portion 45 of a width substantially equal to the diameter of the bore 35 and a narrow portion 45'. A shoulder is thus formed between the wide and narrow portions of the slot with which the rounded portion between the narrow end 43 and the head 45 of the bolt is normally engaged by an expansive spring 46 confined between the upper end of the locking bolt and a retaining member 47.

The retaining member 47 is pressed from bendable metal and has a central spring engaging part 48 and side flanges 49 receivable in transverse channels 50 formed in the mounting head in communication with the wide portion 45 of locking bolt receiving opening. The spring engaging central part 48 extends inwardly to align with the longitudinal axes of the locking bolt and the spring is held against displacement by a projection 51 on the lower end of the central spring engaging part 48 and an upwardly extending lug 52 on the locking bolt, the lug 52 and the seat for the spring being disposed inwardly of the upper end of the locking bolt to permit a longer spring to be used without necessitating additional space.

In assembly, the lock cylinder is inserted in the mounting head from its rear, after which the locking bolt and the retaining member 47, together with the spring 46, are inserted. The assembled structure is then slid into the driving member 21 before its nut element engaging lugs 28 are pressed inwardly to their operative positions. It is noted that after the structure is assembled with the driving member the inner wall of the driving member prevents outward movement of the spring retainer 47 and the lower ends of its side flanges 49 by extending downwardly over the inner end of the lock cylinder prevent inward longitudinal movement of the cylinder.

The narrow end 43 of the locking bolt extends beyond the peripheral wall of the mounting head and when the parts are in locked position as illustrated in Figure 2, is projected through an opening 53 in a keeper member 54. The member 54 is pressed from bendable metal and has a curved portion 55 whose outer surface is struck on an arc coinciding with the diameter of the mounting head 33 and the mounting head has a portion of its cylindrical wall cut away, as at 56, to a depth substantially equal to the thickness of the member 54 from its inner face to its opening 42 and from the opening 42 outwardly, the depth of the cut-away portion is increased, as at 57.

With the member 54 engaged in its recess formed by the cut-away portions 56 and 57 in the mounting head, its outer wall forms substantially a continuation of the mounting head and is thus adapted to be received in the driving member together with the mounting head. The inner end of the member 54 is struck laterally and bifurcated to provide a pair of arms 58 adapted to be received in an annular groove 59 formed in the adjacent inner end of the nut element, so that the member 54 and the nut element are restrained against relative axial movement, but are freely rotatable with respect to each other.

The member 54, however, being at all times nonrotatably connected with the mounting head, insures proper alignment of the locking bolt and the opening 53 whenever the driving member and consequently the mounting head are pushed inwardly to their retracted positions. Upon such alignment the bolt snaps into the opening 53 to secure the assembly against relative movement until the bolt is withdrawn by actuation of the key. The end of the curved portion 55 of the keeper member 54 opposite the arms 58 is struck inwardly, as at 60, to substantially close the longitudinal channel provided by the cut-away portion 57 and thus forms a stop with which the outer end of the locking bolt engages, upon its disengagement from the opening 53, the engagement of the locking bolt 34 with the stop 60 limiting the movement of the driving member assembly by the expansive spring 30.

From the foregoing description taken in connection with the accompanying drawings, it will be readily apparent to those skilled in the art to which an invention of the character described appertains, that I provide novel means for locking a nut element against unauthorized movement in which a driving member is yieldably urged to project a tool engageable portion to operative position and simultaneously effect a driving connection between it and the nut element, and wherein simple positive key controlled means are provided for releasably securing the driving member in concealed position with the driving connection between it and the nut element broken.

What I claim as my invention is:

1. In combination, a nut member, a driving member, said members being relatively movable, means on said driving member for effecting a releasable driving connection between the members when in predetermined relative positions, a tool engageable portion on the driving member, means whereby the tool engageable portion of the driving member is exposed to permit the engagement of a tool therewith only when driving connection is effected between the members, and key controlled means for maintaining the members out of said predetermined relative positions.

2. In combination, a nut member, a driving member movable with respect to the nut member, means for effecting a releasable driving connection between the members when the driving member is in a predetermined relative position with respect to the nut member, a tool engageable portion on the driving member, and a casing adapted to cover the tool engageable portion to prevent the application of a tool thereto when the driving member is in a position with respect to the nut member disabling the driving connection between the members.

3. In combination, a driven member, a driving member, said members being relatively movable, means for effecting a releasable driving connection between the members when in predetermined relative positions, a tool engageable portion on the driving member movable to and from exposed position to permit the application of a tool thereto upon relative movement of the members, said tool engageable portion being exposed at the same time the driving connection is effected between the members, and key controlled means carried by one of the members for maintaining the members out of said predetermined relative positions.

4. In combination, a driven member, a driving member, said members being relatively movable, means for effecting a releasable driving connection between the members when in predetermined relative positions, a tool engageable portion on the driving member, a casing maintaining the members assembled and adapted to cover the tool engageable portion to prevent the application of a tool thereto when the members are in predetermined relative positions other than that at which the driving connection is effected between them, and key controlled means for releasably maintaining the members in their last-mentioned relative positions.

5. In combination with a nut element, means for turning the same comprising a driving member shiftable into and out of engagement with said nut element, means mounting the driving member for movement between predetermined limits with respect to the nut element, said driving member having a tool engageable portion of irregular shape projected beyond the driving member mounting means to permit the engagement of a tool therewith when the driving member is in one limit of movement and disposed within the mounting member when the driving member is at its other limit of movement, means yieldably urging the driving member to its first limit of movement, and key controlled means for retaining the driving member in its second mentioned limit of movement against the action of the yielding urging means.

6. In a device of the character described, a rotatable enclosure, a nut element mounted in said enclosure, a driving member for the nut element mounted within the enclosure and rotatable therewith and having a portion providing means with which a tool may be engaged to impart movement to it and the nut element, and said driving member being movable to a position entirely within the enclosure to retract said portion when it is desired to prevent the engagement of a tool therewith.

7. In a device of the character described, a nut member, a driving member for imparting rotation to the nut member means whereby a releasable driving connection is effected between the members when said members are in predetermined relative positions, means for yieldably urging the members to said predetermined relative positions, and means for holding the members out of said predetermined relative positions including a member connected with the nut element and having an aperture, a locking bolt carried by the driving member and engageable in said aperture, and key controlled means carried by the driving member for withdrawing the locking bolt from said member aperture.

8. In a device of the character described, a nut member, a driving member for imparting rotation to the nut member, a lug carried by the driving member and engageable with a recess in the nut member when said members are in predetermined relative positions to effect a driving connection therebetween, means yieldably urging the members to said predetermined relative position, means for holding the members out of said predetermined relative positions including a member freely rotatably connected with the nut member and having an apertured portion, a locking bolt carried by the driving member and engageable in said aperture, key controlled means for withdrawing the locking bolt from said aperture, and an enclosing casing maintaining the mechanism assembled with the nut member.

9. In a device of the character described, a nut member, a driving member for the nut member, lugs carried by the driving member and engageable in recesses in the nut member to effect a driving connection between the members when in predetermined relative positions, spring means interposed between the members for urging the same to said predetermined relative positions, means for releasably holding the members out of said predetermined relative positions and including a keeper member freely rotatably connected with the nut member and having an apertured portion extended therefrom to lie adjacent the driving member, a locking bolt carried by the driving member engageable in the aperture, key actuated means for withdrawing the locking bolt from the aperture, and stop means carried by the extended portion of the keeper member for limiting the movement apart of the nut member and driving member when said members are in their first-mentioned predetermined relative positions.

10. In a lock of the character described, a rotatable casing, a nut member mounted within said casing, a nut engaging member in said casing, mounted to rotate therewith and adapted to occupy a plurality of axial positions therein, a tool engaging portion at one end of said last named member adapted to retract into or project out of an aperture at one end of said casing, and means on said nut engaging member to grip said nut when said tool engaging portion projects from said aperture.

11. In a lock of the character described, a rotatable casing, a nut member mounted within said casing, a nut engaging member mounted in said casing to rotate therewith and adapted to occupy a plurality of axial positions therein, a tool engaging portion at one end of said last named member adapted to retract into or project out of an aperture at one end of said casing, means on said nut engaging member to grip said nut when said tool engaging portion projects from said aperture and means to releasably hold said nut engaging member out of engagement with said nut.

12. In a lock of the character described, a rotatable casing, a nut member mounted within said casing, a nut engaging member mounted in said casing to rotate therewith and adapted to occupy a plurality of axial positions therein, a tool engaging portion at one end of said last named member adapted to retract into or project out of an aperture at one end of said casing, means on said nut engaging member to grip said nut when said tool engaging portion projects from said aperture, and means including a lock controlled plunger to releasably hold said nut engaging means out of engagement with said nut.

13. In a lock of the character described, a rotatable casing, a nut member mounted in said casing, a nut engaging member mounted in said casing and engageable with said nut to effect rotation thereof, said nut engaging member being axially movable in said casing and rotatable therewith, means constantly urging said members apart, and means limiting the axial separation of said members.

14. In a lock of the character described, a rotatable casing, a nut member mounted in said casing, a nut engaging member mounted in said casing and engageable with said nut to effect rotation thereof, said nut engaging member being axially movable in said casing and rotatable therewith, means constantly urging said members apart, means limiting the axial separation of said members and means releasably retaining said nut engaging member out of engagement with said nut.

15. In a lock of the character described, a rotatable casing, a nut member mounted in said casing, a nut engaging member mounted in said casing and engageable with said nut to effect rotation thereof, said nut engaging member being axially movable in said casing and rotatable therewith, means constantly urging said members apart, means limiting the axial separation of said members and means including a key controlled plunger for releasably retaining said nut engaging member out of engagement with said nut.

16. In a lock of the character described, a rotatable casing, a nut member mounted in said casing, a nut engaging member mounted in said casing and engageable with said nut to effect rotation thereof, said nut engaging member being axially movable in said casing and rotatable therewith, means constantly urging said members apart, means limiting the axial separation of said members, and means rotatably mounted on said nut member cooperating with means on said nut engaging member to releasably hold said nut engaging member out of engagement with said nut.

17. In a lock of the character described, a rotatable casing, a nut member mounted in said casing, a nut engaging member mounted in said casing and engageable with said nut to effect rotation thereof, said nut engaging member being axially movable in said casing and rotatable therewith, means constantly urging said members apart, means limiting the axial separation of said members, and means rotatably mounted on said nut member cooperating with means on said nut engaging member to releasably hold said nut engaging member out of engagement with said nut, said means on said nut engaging member comprising a key controlled locking device.

18. In a lock of the character described, a rotatable casing, a nut member mounted within said casing, a nut engaging member mounted in said casing to rotate therewith and adapted to occupy a plurality of axial positions therein, a tool engaging portion at one end of said last named member adapted to retract into or project out of an aperture at one end of said casing, means on said nut engaging member to grip said nut member when said tool engaging portion projects from said aperture and means rotatably mounted on said nut member cooperating with means on said nut engaging member to releasably hold said nut engaging member in retracted position.

19. In a lock of the character described, a rotatable casing, a nut member mounted within said casing, a nut engaging member mounted in said casing to rotate therewith and adapted to occupy a plurality of axial positions therein, a tool engaging portion at one end of said last named member adapted to retract into or project out of an aperture at one end of said casing, means on said nut engaging member to grip said nut member when said tool engaging portion projects from said aperture, and means rotatably mounted on said nut member cooperating with means on said nut engaging member to releasably hold said nut engaging member out of engagement with said nut, said means on said nut engaging member comprising a key controlled locking device.

20. In a lock of the character described, a rotatable casing, a nut member mounted within said casing, a nut engaging member within said casing, mounted to rotate therewith and to occupy a plurality of axial positions therein, a tool engaging portion at one end of said last named member adapted to retract into or project out of an aperture at one end of said casing, means on said nut engaging member to grip said nut when said tool engaging portion projects from said aperture, resilient means constantly urging said nut engaging member into its projected position and means to releasably hold said nut engaging means in retracted position.

21. In a lock of the character described, a cylindrical casing, a nut member having a portion thereon projecting from one end of said casing, a nut engaging member having a tool engaging portion thereon adapted to retract into or project out of an aperture in one end of said casing, and a nut engaging portion at the opposite end of said nut engaging member from said tool engaging portion and adapted to engage said nut when said tool engaging portion is projecting from said aperture and to disengage from said nut when said tool engaging portion is retracted into said aperture.

22. In a lock of the character described, a cylindrical casing, a nut member having a portion thereon projecting from one end of said casing, a nut engaging member having a tool engaging portion thereon adapted to retract into or project out of an aperture in one end of said casing, a nut engaging portion at the opposite end of said nut engaging member from said tool engaging portion and adapted to engage said nut when said tool engaging portion is projected from said aperture and to disengage from said nut when said tool engaging portion is retracted into said aperture and means constantly urging said nut engaging portion into engagement with said nut.

23. In a lock of the character described, a cylindrical casing, a nut member having a portion thereon projecting from one end of said casing, a nut engaging member having a tool engaging portion thereon adapted to retract into or project out of an aperture one end of said casing, a nut engaging portion at the opposite end of said nut engaging member from said tool engaging portion and adapted to engage said nut when said tool engaging portion is projected from said aperture and to disengage from said nut when said tool engaging portion is retracted into said aperture, means constantly urging said tool engaging portion into said projected position, and means to releasably hold said nut engaging member with the tool engaging portion in a retracted position.

In testimony whereof I have hereunto affixed my signature.

EDWARD N. JACOBI.